United States Patent [19]
Battaglia et al.

[11] 3,735,172
[45] May 22, 1973

[54] MOTOR BRUSH HOLDER

[75] Inventors: Patrick A. Battaglia, Elizabeth; Edwin Fitzwater, Rahway, both of N.J.

[73] Assignee: The General Signal Corporation, New York, N.Y.

[22] Filed: Dec. 22, 1971

[21] Appl. No.: 210,683

[52] U.S. Cl..................................................310/239
[51] Int. Cl..............................................H02k 13/00
[58] Field of Search......................310/239, 242, 245, 310/247

[56] References Cited
UNITED STATES PATENTS

| | | | |
|---|---|---|---|
| 3,176,177 | 3/1965 | Huston | 310/247 |
| 3,436,578 | 4/1969 | Walter | 310/242 |
| 3,441,766 | 4/1969 | Amrein | 310/239 |
| 2,045,293 | 6/1936 | Carlson | 310/245 |
| 3,474,274 | 10/1969 | Groschopp | 310/242 |

*Primary Examiner*—R. Skudy
*Attorney*—John F. Ohlandt

[57] ABSTRACT

A motor brush holder is disclosed including a plastic housing having a bore for receiving an electrically conductive brush and spring means engaged at one end with the brush, and further having the provision of a terminal clip means secured at the outer end of the housing in contact with the spring means, and a plastic cover for shielding the terminal clip and its associated wire.

7 Claims, 4 Drawing Figures

Patented May 22, 1973 3,735,172

INVENTORS
PATRICK A. BATTAGLIA
EDWIN FITZWATER
BY John F. Ahlers
ATTORNEY

MOTOR BRUSH HOLDER

BACKGROUND, OBJECTS AND SUMMARY OF THE INVENTION

This invention relates to a brush holder device or assembly for holding the brushes of an electric motor or the like.

A variety of brush holder and brush retaining devices have become known in the art in connection with electrical motors or, in general, with rotating electrical machines. The purpose of such devices is to insure that the brushes are held in proper operating relationship with the commutator of the rotating element of the machine.

A primary consideration in the design of a brush holder intended for engagement with a commutator is that the brush may be easily placed into engagement while being adapted to be connected to an external wire or conductor.

Accordingly it is a primary object of the present invention to ensure that the wiring to the brush element is kept internal to the machine, i.e., that a basic requirement is satisfied of having the wiring connect to the brushes at the outside of the motor casing, but without producing a safety hazard.

Another object is to effect substantial economies in the manufacture and assembling of the parts of a brush holder device.

A further object is to provide a brush holder which is very easily secured to, and removed from, a motor casing.

A more specific object is to facilitate securing of the brush holder to the motor casing by dint of the same cover means whose primary purpose is to prevent any safety hazard.

In fulfillment of the above stated objects a feature of the present invention resides in the provision of a simple housing having a bore for receiving the carbon brush and the spring member constituting essential elements in motor brush construction. The housing is in the form of a plastic sleeve adapted to project through the motor casing or housing. The carbon brush extends through one end of the housing and is urged against a commutator by the spring. The other end of the spring bears against a terminal. This terminal is designed in the form of a spring clip which is easily assembled and removed from the housing. The clip is provided with arcuate end portions in order that it may be fitted around the periphery of the plastic housing. Furthermore, the clip is provided with a terminal lug for attachment of a wire to the clip.

Another feature of the invention resides in the provision of a plastic cover or cap adapted to fit over the outer end of the plastic brush housing. This plastic cover enables protecting the user against any hazard of electrical shock by reason of the fact that the cover isolates the terminal and also shields the wire by providing an enclosed path therefore. Moreover, the plastic cover is so constructed and arranged that it cooperates with the brush housing to permit securing of the brush holder to the motor frame.

Other objects, features and advantages of the present invention may be appreciated by reference to the following description, taken in conjunction with the accompanying drawing, in which:

DESCRIPTION OF PREFERRED EMBODIMENT

Figure 1:
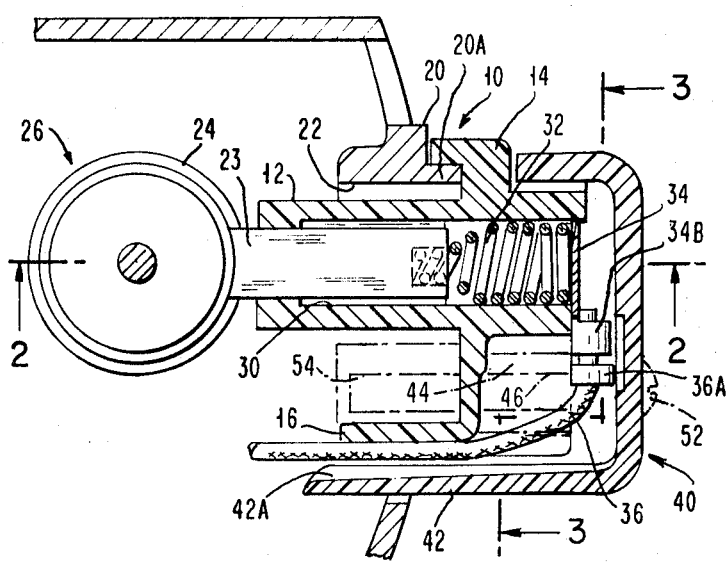
FIG. 1 is an elevational view, partly in section, of a brush holder in accordance with the present invention, illustrating its relationship with a typical electric motor.

Referring now to the drawing, an embodiment of a brush holder in accordance with the present invention is shown as including a housing 10. The housing is preferably composed of plastic and is molded to produce the configuration illustrated. The housing 10 is constructed with a cylindrical portion or sleeve 12 for the purpose of carrying the motor brush. The housing also has an upwardly extending portion 14 adapted to engage with a motor casing 20 at a flange 20A. The brush housing further includes a depending portion 16.

The brush housing 10 is adapted to project through an opening 22 provided in the motor casing 20 so that the requisite operative relationship may be established between a motor brush 23 and a commutator 24 which is part of a rotor 26. When the aforesaid operative relationship is established the sleeve 12 and the depending portion 16 extend within the casing 20 whereas, as noted before, the upwardly extending portion 14 abuts against the casing 20.

The brush 23, having a rectangular cross-section, is disposed within a round bore 30 provided in the sleeve 12. Such an arrangement, constituting a subordinate feature of the present invention, permits thorough ventilation of the brush. A coiled, electrically conductive, spring 32 is also disposed within the bore 30 and engages at its inner end with the brush 28.

In accordance with a primary feature of the present invention, electrical connection is provided to the brush 23 from the outer end of the sleeve 12, and in the preferred case, through the spring 32. However, alternate constructions can be adopted in which the electric current flows through an auxiliary conductor instead of the spring. Either manner of making electrical connection avoids the difficulties attendant upon the use of metal sleeves or the like to surround the brush, and instead, ensures firm constant electrical contact with the brush. As will be seen, the terminal 34 provided at the outer end of the sleeve 12 is in the form of a spring clip. The ends of the terminal clip 34 are provided with arcuate portions 34A which are adapted to engage the periphery of the sleeve 12 at the ears or projections 12A provided thereon. The terminal clip 34 is typically formed of brass or the like and has a thickness of the order of 0.016 inches. The clip 34 includes at its lower longitudinal edge an integrally formed terminal lug 34A. A field lead or wire 36, having a terminal collar 36A, has its bared end 36B retained by crimping of the terminal lug 34A. It will be noted that the wire 36 extends longitudinally of the brush holder and is retained within a groove 38 formed in the lower surface of the portion 16 of housing 10.

Figure 3:
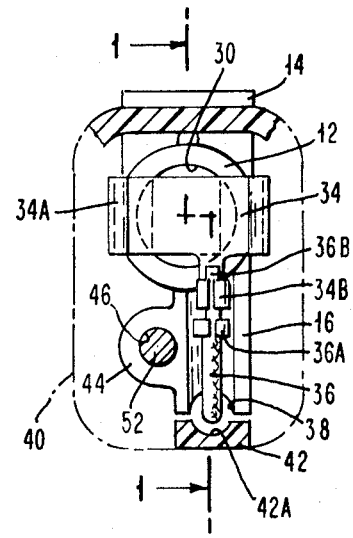
FIG. 3 is a sectional end view of the brush holder taken on the line 3—3 in FIG. 1.
Figure 2:
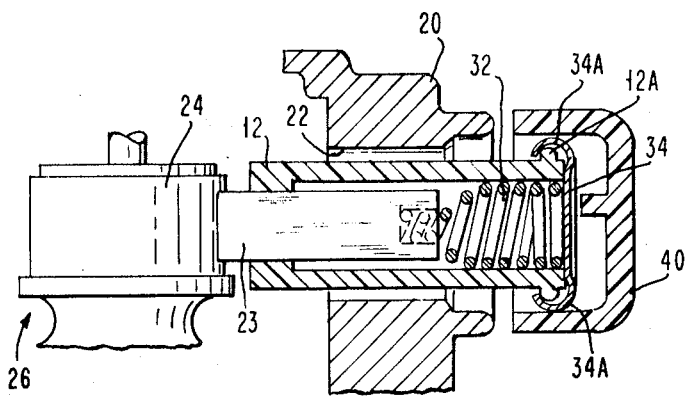
FIG. 2 is a sectional view of the brush holder taken on the line 2—2 in FIG. 1.

The brush holder of the present invention also includes a plastic cover 40 which is judiciously arranged to provide protection against possible safety hazards arising from the fact that the terminal clip 34 and wire 36 are provided at the end of the housing 10. Thus, it will be seen, especially by reference to FIG. 3, that the plastic cover 40 has a longitudinally extending portion 42 in which there is formed a channel or groove 42A. This groove 42A cooperates with the aforementioned groove 38 in the housing 10 so as to define a closed path for the wire 36. It will, therefore, be appreciated that all safety hazards are avoided because of this special construction of the plastic cover 40 whereby the cover not only surrounds the terminal clip 34 but also completely shields the wire 36 so as to eliminate contact therewith. Moreover, ease of assembly of the brush holder is effected by reason of the fact that the closed path for field lead or wire 36 is defined by the two grooves 38 and 42A. This arrangement overcomes the necessity, present in the case of an ordinary hole in the plastic housing, of threading the wire 36 through such hole.

Figure 4:
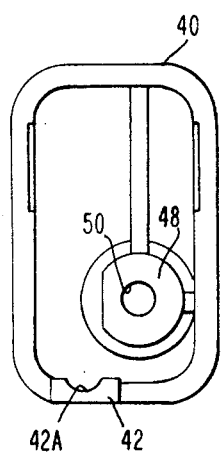
FIG. 4 is an end view, illustrating the cover for the brush holder.

It will further be appreciated that the plastic cover 40 is so constructed that it cooperates with the housing 10 to ensure that the housing will be firmly attached to the motor casing 20. This is accomplished by the provision of a longitudinally extending boss 44 carried by the depending portion 16 of the housing 10. The boss 44 includes a suitably disposed receiving bore 46. As seen in FIG. 4, a suitably aligned boss 48, included as part of the cover 40, cooperates with the boss 44 in securing the plastic cover inasmuch as boss 48 has a corresponding receiving bore 50. When the cover 40 is placed in position over the housing, a screw 52 is placed within the aforenoted receiving bores and is further received within a bore 54 formed in the motor casing, as shown in phantom outline in FIG. 1. Tightening of the screw 52 thus effects firm attachment of the entire brush holder assembly to the motor casing.

What has been disclosed is a brush holder device uniquely adapted to achieve easily replaceable engagement of a brush with a rotor or the like. Moreover, the brush holder enables connecting an external wire or conductor to the brush while preventing safety hazards to the user.

I claim:
1. In a brush holder device adapted to be attached to a motor casing and having:
   a plastic housing, including a sleeve provided with a bore for receiving an electrically conductive brush and spring means engaged at one end with said brush, and a conductive lead connected to said brush,
   the improvement comprising a terminal clip secured at the outer end of the housing in contact with said spring means, said clip having arcuate end portions fitting around the periphery of said housing;
   said conductive lead being in the form of a wire lead extending from within said motor casing to said outer end of the housing, and being connected thereat to said clip;
   a plastic cover engaging with the outer end of said housing, said cover having a longitudinal groove cooperatively defining, with a corresponding groove formed in said housing, an enclosed path for said conductive wire lead.
2. A device as defined in claim 1 in which said clip is connected through said spring means to said brush.
3. A device as defined in claim 1 in which said clip is provided with a terminal lug adapted to receive the outer end of said conductive wire lead.
4. A device as defined in claim 1, further comprising means for securing said plastic cover so as to firmly attach said housing to said motor casing.
5. A device as claimed in claim 1 in which said housing includes an upwardly extending portion for abutting with the casing of said motor, and a depending portion in which said corresponding groove is formed and in which a boss is provided having a bore.
6. A device as defined in claim 5 in which said plastic cover includes a boss adapted to be aligned with said boss in said housing.
7. A device as defined in claim 1 in which the bore in the sleeve of said housing has a round cross-section and said brush has a rectangular cross-section.

* * * * *